April 23, 1929.  L. W. BONNEY  1,710,673
AEROPLANE WING OR AEROFOIL STRUCTURE
Filed Dec. 14, 1925   5 Sheets-Sheet 1

INVENTOR.
Leonard W. Bonney
BY Chas. H. Kell
ATTORNEYS.

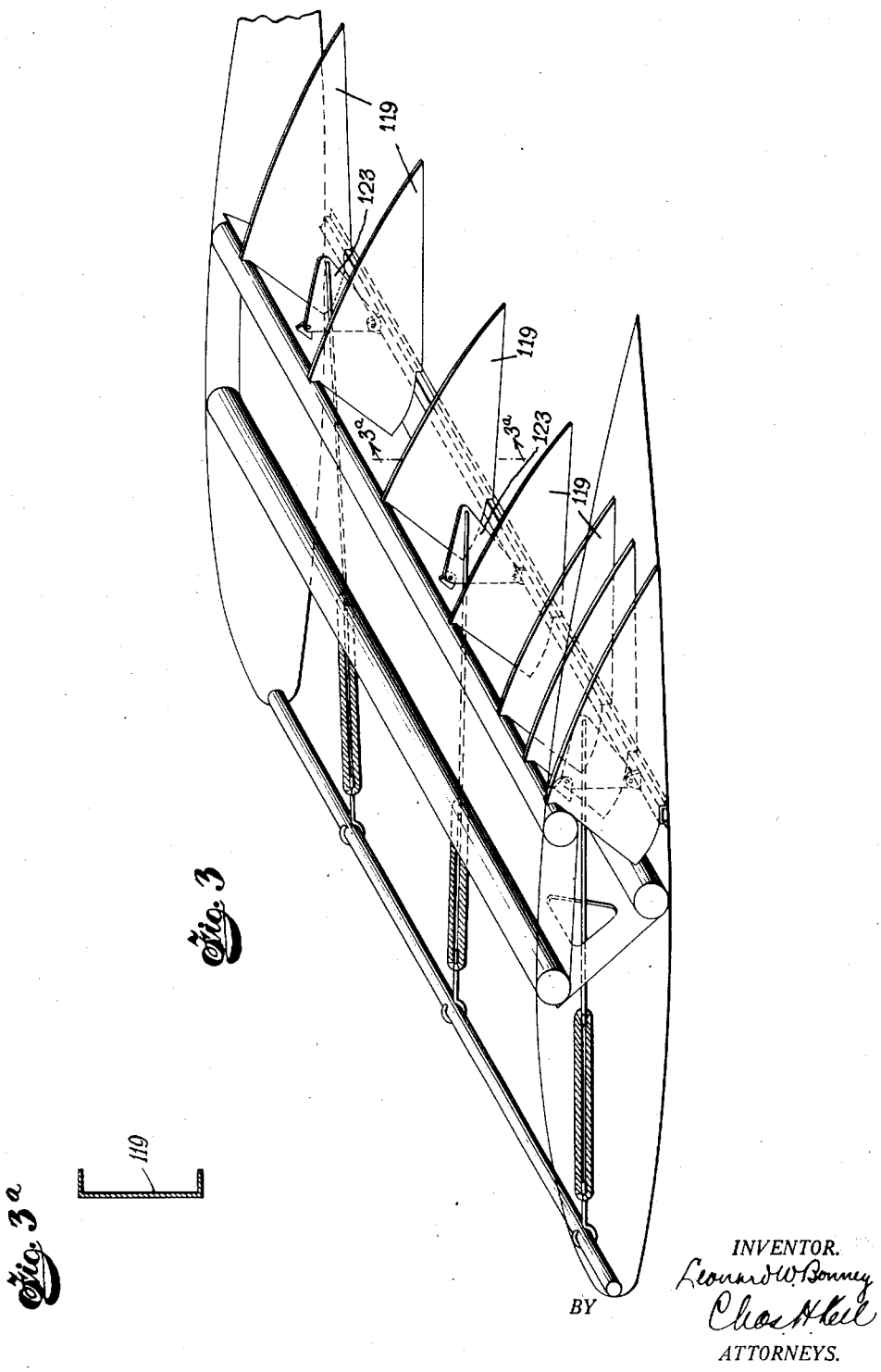

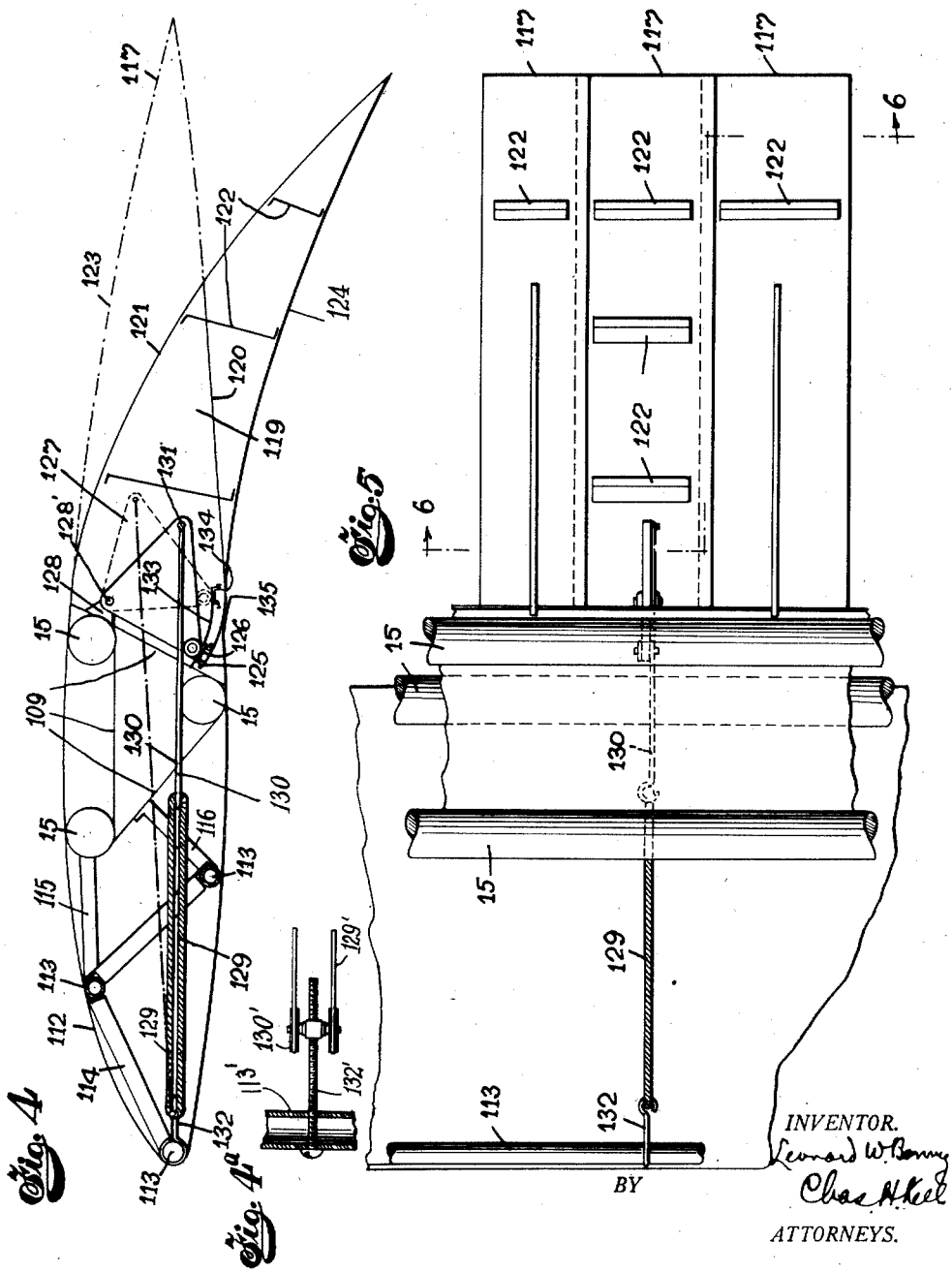

April 23, 1929.  L. W. BONNEY  1,710,673
AEROPLANE WING OR AEROFOIL STRUCTURE
Filed Dec. 14, 1925   5 Sheets-Sheet 4
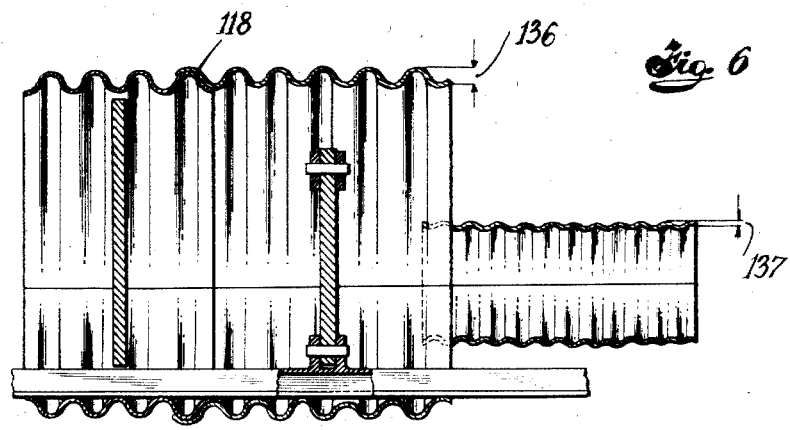
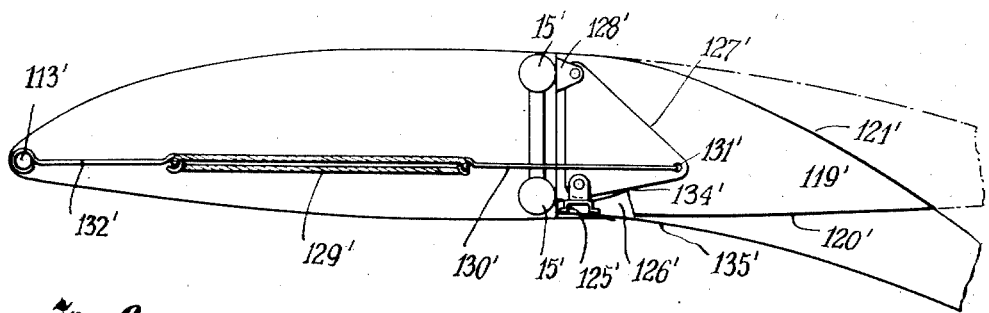
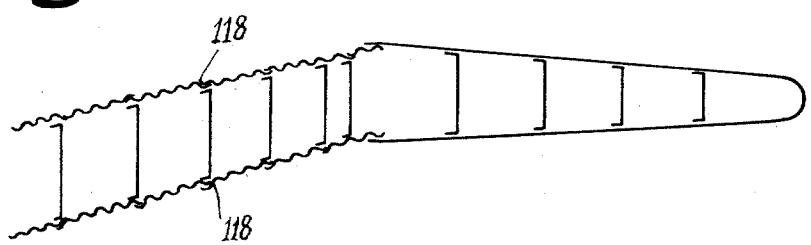
INVENTOR.
Leonard W. Bonney
Chas H. Keel
BY
ATTORNEYS.

April 23, 1929.  L. W. BONNEY  1,710,673
AEROPLANE WING OR AEROFOIL STRUCTURE
Filed Dec. 14, 1925  5 Sheets-Sheet 5
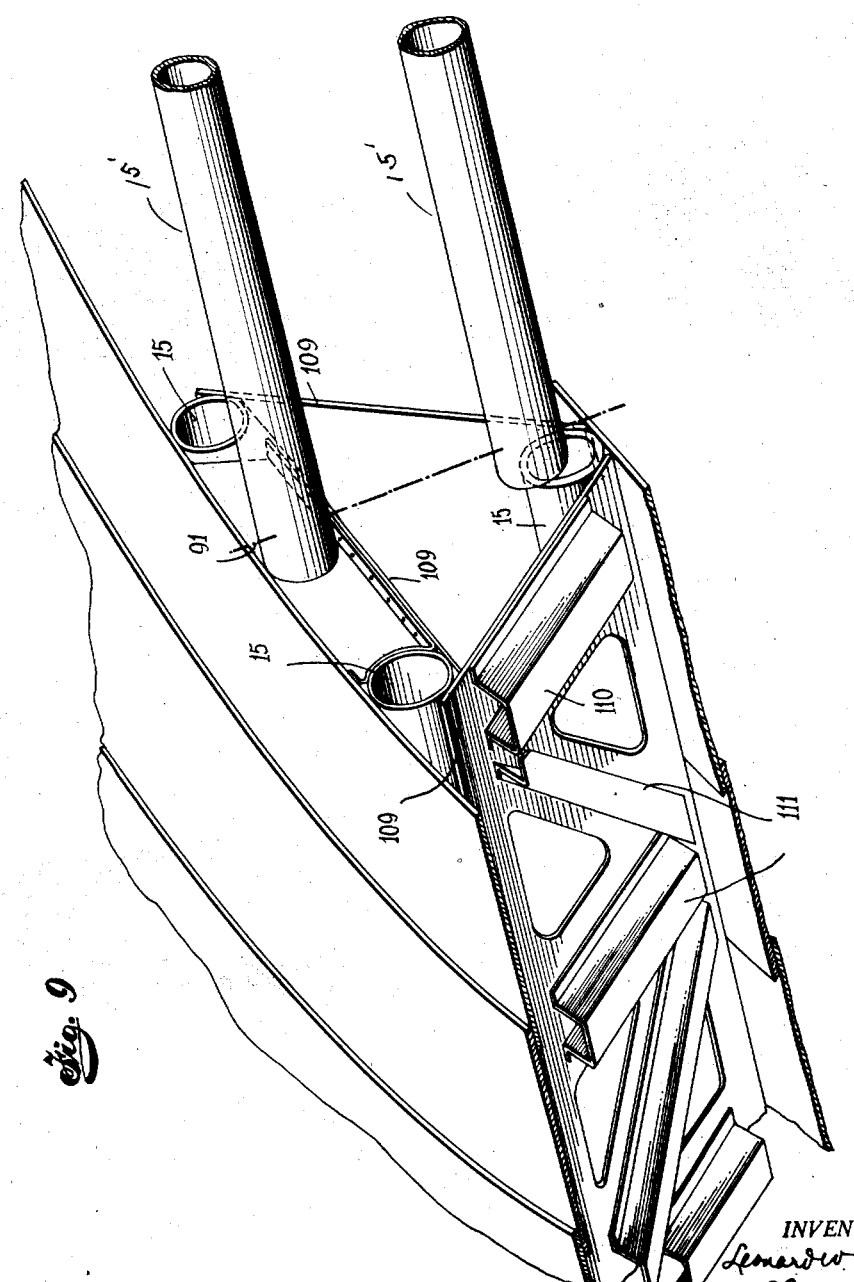

Patented Apr. 23, 1929.

1,710,673

UNITED STATES PATENT OFFICE.

LEONARD W. BONNEY, OF FLUSHING, NEW YORK; FLORA MacDONALD BONNEY EXECUTRIX OF SAID LEONARD W. BONNEY, DECEASED.

AEROPLANE WING OR AEROFOIL STRUCTURE.

Application filed December 14, 1925. Serial No. 75,169.

This invention relates to aircraft of the heavier-than-air type.

The object of the invention generally is an aeroplane which is peculiarly characterized by its even and smooth flying qualities free from the usual vibrations and pitching characteristics of many prior planes, and which is capable of safe and efficient operation at widely varying speeds. More particularly my invention resides in an aerofoil or wing of novel inherently flexible construction which automatically functions to contribute to an even, smooth and vibrationless flight and whose curvature is automatically variable during flight to accommodate itself to widely differing speeds and relative air speed conditions. A further object of the invention is a wing generally of this type which is of a safe, reliable and dependable construction, and which is characterized further by the simplicity of its parts and mechanism and by the readiness with which it may be repaired.

For a better understanding of the invention, reference may be had to the accompanying drawings forming a part of this application wherein—

Figure 1:
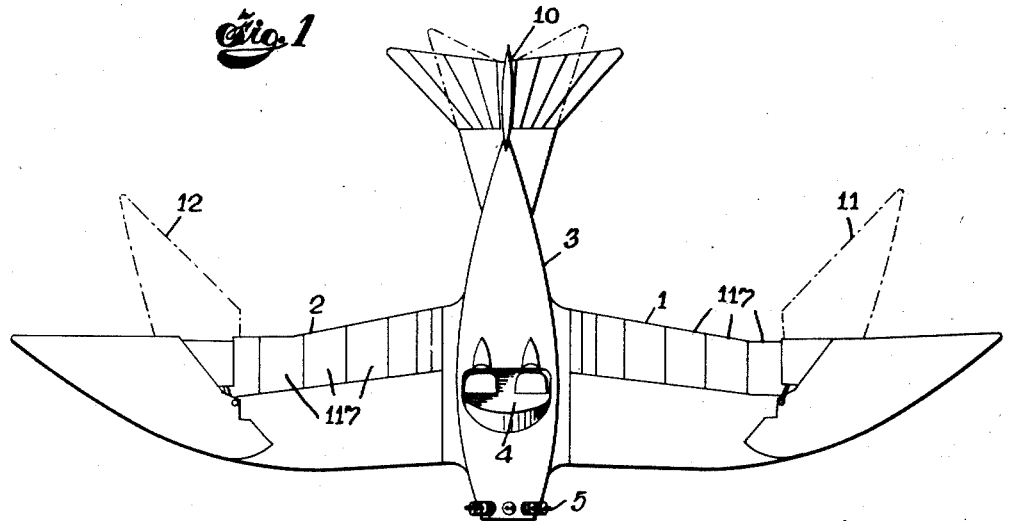
Fig. 1 is a plan view of an aeroplane including my invention.
Figure 2:
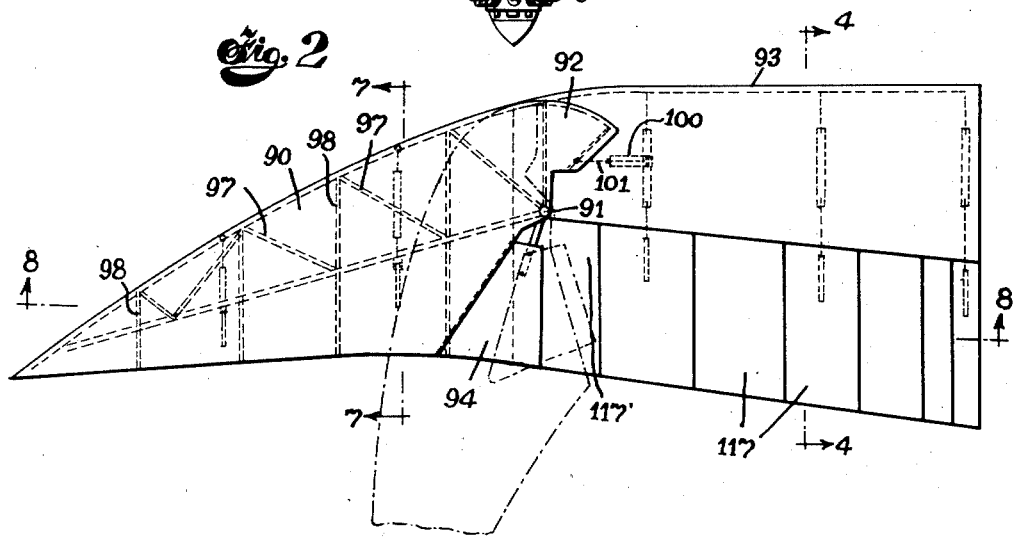
Fig. 2 is an enlarged plan view of the wing and tip.
Figure 2A:
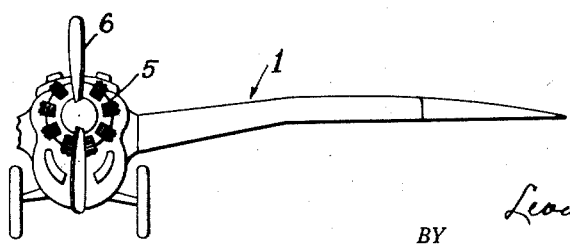

Fig. 2ª is a front view of the plane,

Fig. 3 is a diagrammatic perspective view of the wing structure,

Fig. 3ª is a sectional view of a wing form member,

Fig. 4 is a cross section of the wing,

Fig. 4ª is a detail of adjusting mechanism for the flexible part of the wing,

Fig. 5 is a plan view on an enlarged scale of the wing,

Fig. 6 is a sectional view along the line 6—6 of Fig. 5,

Fig. 7 is a sectional view along the line 7—7 of Fig. 2,

Fig. 8 is a section along the line 8—8 of Fig. 2, and

Fig. 9 is a perspective view of the wing structure main frame.

Referring to the drawings where similar reference numerals designate similar parts throughout, I have illustrated my invention as embodied in an aeroplane of the monoplane type including the left and right hand wing sections 1 and 2 carrying a central main body 3. The latter contains at any suitable point the cockpit 4 for the pilot and passengers and carries at the front end any suitable motor 5 and propeller 6. The aeroplane herein exhibited also includes a special tail unit including a flexible variable surface elevator 10 and the flexible variable wing tips 11 and 12, these tips being differentially variable for assisting in effecting the lateral stability control and also variable in the same direction for the purpose of varying the aspect ratio of the plane to correspond to different operating speeds.

The wing structure is built up around a triangular spar which forms the backbone of the wing and consists of the three tubular members 15 which are suitably braced between each other, as for example by the weblike members 109 which are secured to the tubular members 15 in any suitable manner and are strengthened by the U shaped bracing members 110 and 111 secured to the exterior thereof. This spar is substantially centrally disposed between the leading and trailing edges of the wing. The nose 112 is carried by a frame consisting of the longitudinal tubular members 113 which are braced between themselves by the bracing members 114 and this frame is supported from the main central spar by the upper and lower bracing members 115 and the diagonal members 116. The rigid part of the wing consists of the central spar member and the forward nose frame member. The remaining portion or trailing part of the wing is of a flexible character to compensate for varying speed and flying conditions and consists in the preferred embodiment of a plurality of individual feathers 117 whose upper and lower covering surfaces are preferably of metal and are provided with corrugations longitudinal of the feathers indicated in Fig. 6, these surfaces overlapping, as indicated at 118, to form continuous upper and lower surfaces. Each feather is carried by a form or bulkhead member 119 extending longitudinally thereof, this form member being rigidly attached in any suitable manner to the central spar structure of the wing and having a lower surface or supporting edge 120 corresponding to the lower surface of the aerofoil in the high speed position of the trailing edge of the wing. It also has an upper surface or supporting edge 121 corresponding to the upper surface of the trailing edge of the wing when the trailing edge is in its lowermost position for slow speed conditions. Each of these bulkheads 119 may be formed of web construction with suitable turned-over flanges 119' to serve as supporting surfaces for the feather covering. The trailing feathers 117 are of shell-like form, having any suitable interior bracing or frame construction diagrammatically indicated at 122, and are flexible as for example of flexible metal so as to be adjustable from the full line position indicated in Fig. 4 to the dotted line position or to assume any intermediate positions. The upper coverings of the feathers 117 are either united to or form continuations of the upper covering of the rigid part of the wing frame, while the lower coverings 124 of the feathers are discontinued in the vicinity of the spar structure 15 as for example along the line indicated at 125. The leading edges 125 of the lower feather coverings 124 are connected to the elongated channel shaped member 126, the latter member being pivotally carried by a multiplicity of spaced levers 127 which levers are in turn pivotally carried by brackets 128 secured to the main spar. These levers 127 in the particular embodiment shown are of triangular web-like construction and are movable in vertical planes to various positions about the pivots 128', depending upon the position of the trailing feathers 117. These mechanisms 127 are yieldingly maintained in the full line position indicated in Fig. 4 for low speed operation with the trailing feathers 117 in their lowermost position and spring tension devices 129 are provided for this purpose which, in the particular embodiment shown, are in the form of elastic cord loops which are connected at one end by means of the links 130 to the lever mechanisms at 131 and at the other end by means of the links 132 with the leading longitudinal frame member 113 of the wing nose. The lower inner edges of the bulkhead members 119 are cut away as at 133 in the arc of a circle, with the pivotal points 128 as the centers to clear the moving elongated channel member 126 and also to form a positive stop 134 for this channel when the trailing feathers 117 are in the uppermost position. The rearmost edge 135 of the lower covering of the nose of the wing forms a sliding fit with the lower covering 124 for the trailing feathers 117, so as to form a closed lower surface in all positions of the feathers. With this construction of the trailing edge, the feathers 117 are free to flex up and down, the full line position of Fig. 4 representing the slowest speed position, while the dash-and-dot position represents the full or maximum speed position. For example, by means of the mechanisms including the bell crank lever 127 and the biasing members 129, each feather is normally held in its lowermost position, but with increases of speed or of lift pressure or shift of the center of pressure upon the trailing portion of the wing, these mechanisms permit the elevation of the trailing portion of the wing, the elevation depending upon the pressure exerted, while the supporting member 119 serves as a positive stop for the upper and lower limits of the flexible adjustments. It is possible, therefore, in this construction, for the trailing portion of the wing to float between the upper and lowermost operating conditions indicated during normal flight, the plane inherently compensating for the varying flying conditions. A particularly important feature of construction of the inherently flexible wing is the decreasing leverage arm as the biasing means become more extended upon the straightening out of the trailing edge. For example, the line of pull of the cords 129 approach more closely the pivot points 128' as the trailing edge 117 is elevating by an increase or a shifting of center of pressure, and conversely the leverage arm increases with the lowering of the trailing edge and shortening of the cords 129, thereby tending to compensate for variations in the shift of the center of pressure at different speeds. This flexible and compensating wing construction also cooperates with the adjustable wings, the flexible and extensible wing tips and the extensible and flexible elevator surface to obtain the maximum of smoothness and evenness of control, maneuverability and actual flying.

For the purpose of assisting the yielding internal mechanism of the flexible portion of the wing and functioning therewith to give a gradually increasing flexibility to the wing towards the trailing edge thereof, I prefer to form the covering of the feathers 117 with corrugations of decreasing depth from the central spar construction 15 to the trailing edge, the difference in the depth of the corrugations at the trailing edge and at the forward edge of the feathers being indicated in Fig. 6,—the depth of the corrugations near the forward edge of the feathers being indicated at 136, and the depth of the corrugations near the trailing edge being indicated at 137. The increase of the depth of the corrugations towards the forward end of the feathers gradually stiffens the feathers towards the forward end, while the shallow corrugations at the trailing edge do not add substantially to the stiffness thereof, and in certain instances it may be desired to have the corrugations taper down to zero as the trailing edge so as to eliminate the corrugations on the trailing edge altogether.

In Fig. 2 I have indicated diagrammatically the variable wing tip 11 which of course is identical in construction with the corresponding wing tip 12. Each wing tip in the particular embodiment illustrated includes a main elongated feather 90 which is pivoted at 91 to the wing structure for pivotal movements in the horizontal plane, the root of such feather being in the form of or attached to a sector 92 which forms a continuation of the leading edge 93 of the wing in any adjusted position of the feathers. There are a plurality of feathers for each wing tip which are pivoted to the main frame at 91, and in the particular embodiment shown, there are two such feathers, the main feather 90 and an auxiliary feather 94. The feathers or blade-like members 90 and 94 may be extended or opened as is shown in full lines to increase the wing surface, or they may be closed or turned down to the position indicated in dotted lines to decrease the wing surface and vary the aspect ratio for higher speed operating conditions, or they may assume any intermediate point between the dotted positions and the full line positions indicated. The fan-like blades or feather members are linked together by the links 95—96 so as to effect simultaneous closing and opening movements. These feathers or blade members 90 and 94 are preferably flexible so as to yield in the vertical direction in response to undue pressures exerted thereupon, and such flexibility may be secured, at least in part, by utilizing flexible material such for example as flexible metal. Added flexibility may be secured by special internal construction, such for example as the internal spring construction mechanism of the trailing feathers 117 above described. This mechanism is indicated in Fig. 7 which is a sectional view along the line 7—7 of Fig. 2. There are a number of these mechanisms and each includes an internal web-like or form member 119' having an under surface 120' and an upper surface 121' corresponding respectively to the curvatures of the wing tip feather in the uppermost and lowermost positions. Between the form members 119' are disposed the several lever mechanisms 127', each being pivotally carried by suitable brackets 128 fixed to the main wing tip spar 15'. These lever mechanisms are of triangular web-like form similar to the levers 127 above described and similar elastic cords 129' connect these levers 127' with the forward frame member 113' by means of the intermediate links 130' and 132'. The other corners of the triangular web-like lever devices 127' carry the channel member 126' which is pivotally attached thereto and to the latter is attached the forward edge 125' of the lower covering of the trailing edge of the wing tip. These mechanisms are generally similar to the mechanisms above described in connection with the main part of the wing and yield-ingly permit automatic adjustments of the trailing edge of the feather or wing tip in response to increases of or shifting of center pressure and varying speeds. The wing tip structure and mechanism are more or less diagrammatically illustrated, the details being omitted for convenience in exposition, but I have indicated generally at 97 and 98 the internal conventional frame work of the wing tip, including ribs extending between the main spar 15' and the nose tube 113'.

In Fig. 8 I have indicated a diagrammatic sectional view showing the manner in which the coverings of the adjacent feathers 90 and 94 telescope over each other when they are closed in the fan-like manner indicated in dotted lines in Fig. 2 and also the telescoping of the innermost feather 94 with the end feather 117' of the main part of the wing. At 100 I have indicated conventionally a hydraulic cylinder with its piston rod 101 pivotally connected to the sector 92 for operating the wing tip 90 about its pivotal point 91 and through this wing tip feather 90 the intermediate auxiliary feather 94.

In Fig. 4ª I have shown the elastic cord loop 129' carried by the sheaves or pulleys 130', the latter being carried by the screw-threaded bolt 132' which passes through the nose tube 113'. By screwing out or in the bolt 132' greater or less tension may be put upon the cord loops.

Having thus described my invention, what I claim and desire to protect by Letters Patent, is the following:

1. In a wing construction for aeroplanes a main frame member extending longitudinally of the wing and a flexible trailing portion carried by said main frame member including a plurality of individually adjustable feather-like aerofoil portions which are adjustable about axes transverse to the line of flight, each feather including an individual yielding and controlling mechanism disposed on the interior thereof.

2. In a wing construction for aeroplanes, a main frame member extending longitudinally of the wing and an automatically variable wing structure carried thereby including a plurality of individually flexible feather like members closely and adjacently disposed and capable of movements in planes in the fore and aft direction, said feathers including sheet metal covers flexible in the fore and aft direction and having corrugations extending longitudinally of the feathers.

3. In a wing structure of the character set forth in claim 2 wherein the corrugations for the feather coverings decrease in depth from the forward to the trailing end.

4. In a wing structure for aeroplanes a main frame member extending longitudinally of the wing, a plurality of tapered form members carried by the said main frame member, a flexible shell structure enclosing said form members and yielding connections between said shell-like enclosing portion and the wing frame for permitting relative adjustments of the shell like portion of the wing.

5. A wing structure of the character set forth in claim 4 wherein the form members have extended upper and lower edges for engaging the shell like portion of the wing in the lowermost and uppermost positions thereof respectively.

6. A wing structure for aeroplanes including a flexible main body portion and a separate flexible aileron portion combined into a unitary structure so as to flex in unison in any position of the aileron.

7. A wing structure for aeroplanes including a flexible trailing edge portion throughout its length including a separate aileron surface pivotally mounted for adjustments about a substantially vertically disposed axis, the two flexing together in any position of the aileron.

8. A wing for aeroplanes including a main frame work for the main body portion of the wing and a flexible trailing edge and a wing tip consisting of a plurality of fan-like feather members adapted to telescopically close upon one another and upon the outer flexible portion of the main body portion of the wing.

9. In a wing construction for aeroplanes, a main frame member extending longitudinally of the wing and a flexible wing structure carried thereby including a plurality of bell crank levers pivotally carried by the main frame structure, one end of said bell crank levers being connected with the flexible portion of the wing to effect adjustments thereof, a plurality of yielding mechanisms connecting the other ends of the bell crank levers with a fixed part of the wing structure, and positive stops for arresting the flexible portion of the wing in its extreme limits of operation.

10. In a wing construction for aeroplanes, a main frame member extending longitudinally of the wing and a flexible wing structure carried thereby including a plurality of bell crank levers pivotally carried by the main frame structure, one end of said bell crank levers being connected with the flexible portion of the wing to effect adjustments thereof, a plurality of yielding mechanisms connecting the other ends of the bell crank levers with a fixed part of the wing structure, and an internal form device for the trailing edge of the wing rigidly carried by the fixed frame work and having upper and lower stop and bearing surfaces for the trailing edge of the wing corresponding to the upper and lower curvatures of the wing for the lower and uppermost positions of the flexible portions thereof respectively.

11. In a wing construction for aeroplanes, a main frame member extending longitudinally of the wing and a flexible wing structure carried thereby including a plurality of bell crank levers pivotally carried by the main frame structure, one end of said bell crank levers being connected with the flexible portion of the wing to effect adjustments thereof and a plurality of yielding mechanisms connecting the other ends of the bell crank levers with a fixed part of the wing structure, the yielding mechanisms and connections being such that the pull thereof decreases at the higher speed adjustments.

12. In a wing construction for aeroplanes a main frame extending longitudinally of the wing and a flexible wing structure carried thereby and an internal form device rigidly carried by the longitudinal frame and having upper and lower stop and bearing surfaces for the flexible part of the wing corresponding to the upper and lower curvatures of the wing for the lower and uppermost positions of the flexible portions thereof respectively.

13. A wing structure of the character set forth in claim 12 wherein the flexible part of the wing is yieldingly held downwardly against the form device to correspond to the slow speed curvature.

14. A wing of the character set forth in claim 12 including a yielding holding mechanism normally tending to bias the flexible part of the wing against the upper surface of the form device, but permitting the flexible part to be yieldingly operated to a position against the lower surface of the internal form device.

15. In a wing construction for aeroplanes a main frame extending longitudinally of the wing, and a flexible trailing wing part carried by the frame member, a plurality of internal form devices for the flexible trailing part of the wing rigidly carried by the longitudinal frame and having upper and lower stop and bearing surfaces for the trailing edge of the wing corresponding to the upper and lower curvatures of the wing for the lowest and uppermost positions of the flexible portions thereof respectively, and a yielding retaining mechanism tending to hold said flexible trailing part of the wing in its lowermost position against the upper surfaces of said form devices, including means whereby the pull of the yielding retaining devices automatically decreases as the trailing edge moves upward.

16. A wing structure of the character set forth in claim 15 wherein the yielding retaining mechanism includes a plurality of bell crank levers pivoted to the longitudinal frame and to the trailing portion of the wing and elastic members attached at one end to the nose of the wing and at the other end to their corresponding levers.

17. A wing of the character set forth in claim 15 wherein the flexible trailing part of the wing is in the form of a multiplicity of individually flexible feather members.

18. An aerofoil or supporting wing structure for aeroplanes including a central spar structure forming the backbone of the wing and a flexible trailing wing structure carried by the central spar construction and including a mechanism permitting automatic adjustments of the flexible trailing edge with reference to the central spar construction, including pivoted members carried by the wing frame, one part of each of said members being attached to the trailing edge and another part thereof being connected with forwardly extending yielding cord or spring members attached to the wing frame, the arrangement being such that lines of the pull of cords approach the pivot points of the members as the same become extended.

In testimony whereof, I have signed my name to this specification.

LEONARD W. BONNEY.